(12) United States Patent
Cowan et al.

(10) Patent No.: US 10,315,304 B1
(45) Date of Patent: Jun. 11, 2019

(54) CARGO RETRIEVAL ASSEMBLY

(71) Applicants: Keith Cowan, Seattle, WA (US);
 Debbie Whiteley, Seattle, WA (US)

(72) Inventors: Keith Cowan, Seattle, WA (US);
 Debbie Whiteley, Seattle, WA (US)

(*) Notice: Subject to any disclaimer, the term of this patent is extended or adjusted under 35 U.S.C. 154(b) by 0 days.

(21) Appl. No.: 16/150,629

(22) Filed: Oct. 3, 2018

(51) Int. Cl.
 *B25J 1/00* (2006.01)
 *B25J 1/12* (2006.01)
 *B25J 1/04* (2006.01)
 *B25H 5/00* (2006.01)

(52) U.S. Cl.
 CPC . *B25J 1/04* (2013.01); *B25H 5/00* (2013.01)

(58) Field of Classification Search
 CPC .................................... B25J 1/04; B25H 5/00
 USPC ................ 294/210, 174, 26, 15; 273/148 R;
 D8/14; 15/144.4; 16/429, 431, 436;
 410/141, 145, 151
 See application file for complete search history.

(56) References Cited

U.S. PATENT DOCUMENTS

| | | | | |
|---|---|---|---|---|
| 3,469,878 A * | 9/1969 | De Haan | ............... | B60P 3/41 294/210 |
| 3,644,951 A * | 2/1972 | Colburn | ............. | B25B 27/0035 294/24 |
| 4,624,494 A * | 11/1986 | Huppert | ................. | B25J 1/04 294/175 |
| 5,169,190 A * | 12/1992 | Franklin | ................. | B60P 7/14 292/336.3 |
| 5,171,052 A * | 12/1992 | Cunningham | ........... | B65G 7/12 294/210 |
| 5,201,559 A * | 4/1993 | Boring | ................... | B25B 27/04 294/210 |
| 5,487,576 A * | 1/1996 | DuVivier | ................. | B25B 9/00 294/210 |
| 5,502,864 A * | 4/1996 | Sorenson | ............ | B05C 17/0205 15/144.4 |
| 5,593,196 A * | 1/1997 | Baum | ....................... | B25J 1/04 294/174 |
| 5,823,590 A * | 10/1998 | Forrest | ...................... | B25J 1/04 294/104 |
| 6,065,787 A * | 5/2000 | Jarosch | .................... | B25B 9/00 294/210 |
| 6,270,133 B1 * | 8/2001 | Babcock | .................. | B65G 7/12 294/15 |
| D459,959 S | 7/2002 | Fetterman | | |
| 6,450,557 B1 * | 9/2002 | Martinez | ................ | A47F 13/06 294/210 |
| D493,680 S * | 8/2004 | Raymond | ....................... | D8/14 |

(Continued)

*Primary Examiner* — Paul T Chin (57) ABSTRACT

A cargo retrieval assembly includes a handle that has a length of at least 1.2 meters and the handle may be extended into a bed of a pickup. A member is slidably positioned in the handle such that the handle and the member combine to have a telescopically adjustable length, and the member has a length of at least 1.2 meters. A rocker is pivotally coupled to the handle and the rocker engages the member when the rocker is in a locking position to retain the handle and the member at a selected length. The rocker disengages the member when the rocker is manipulated for adjusting the telescopic length of the handle and the member. A grapple is removably coupled to the member has the grapple is oriented perpendicular to the member for engaging, and thusly retrieving, cargo when the member is extended into the bed of the pickup.

7 Claims, 6 Drawing Sheets

(56) References Cited

U.S. PATENT DOCUMENTS

| | | | |
|---|---|---|---|
| 7,334,825 B1 * | 2/2008 | Sammon | B25H 5/00 294/24 |
| 7,474,851 B2 * | 1/2009 | Inman | H04L 1/205 398/16 |
| 7,478,851 B2 | 1/2009 | Geller | |
| 7,490,880 B1 * | 2/2009 | Matsui | A47F 13/06 294/210 |
| 7,673,912 B2 | 3/2010 | Breininger | |
| 7,942,106 B2 * | 5/2011 | Cromartie | B63H 19/08 114/221 R |
| 8,262,147 B2 | 9/2012 | Boyum | |
| 8,915,529 B1 | 12/2014 | Bond | |
| 9,227,317 B1 | 1/2016 | Conley | |
| 9,598,024 B2 | 3/2017 | Kogut | |
| 2003/0020292 A1 * | 1/2003 | Hsu | B25J 1/04 294/210 |
| 2004/0100109 A1 * | 5/2004 | Johnson | A47F 13/06 294/26 |

* cited by examiner

CARGO RETRIEVAL ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to retrieval devices and more particularly pertains to a new retrieval device for retrieving cargo from a bed of a pickup.

BRIEF SUMMARY OF THE INVENTION

An embodiment of the disclosure meets the needs presented above by generally comprising a handle that has a length of at least 1.2 meters and the handle may be extended into a bed of a pickup. A member is slidably positioned in the handle such that the handle and the member combine to have a telescopically adjustable length, and the member has a length of at least 1.2 meters. A rocker is pivotally coupled to the handle and the rocker engages the member when the rocker is in a locking position to retain the handle and the member at a selected length. The rocker disengages the member when the rocker is manipulated for adjusting the telescopic length of the handle and the member. A grapple is removably coupled to the member has the grapple is oriented perpendicular to the member for engaging, and thusly retrieving, cargo when the member is extended into the bed of the pickup.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
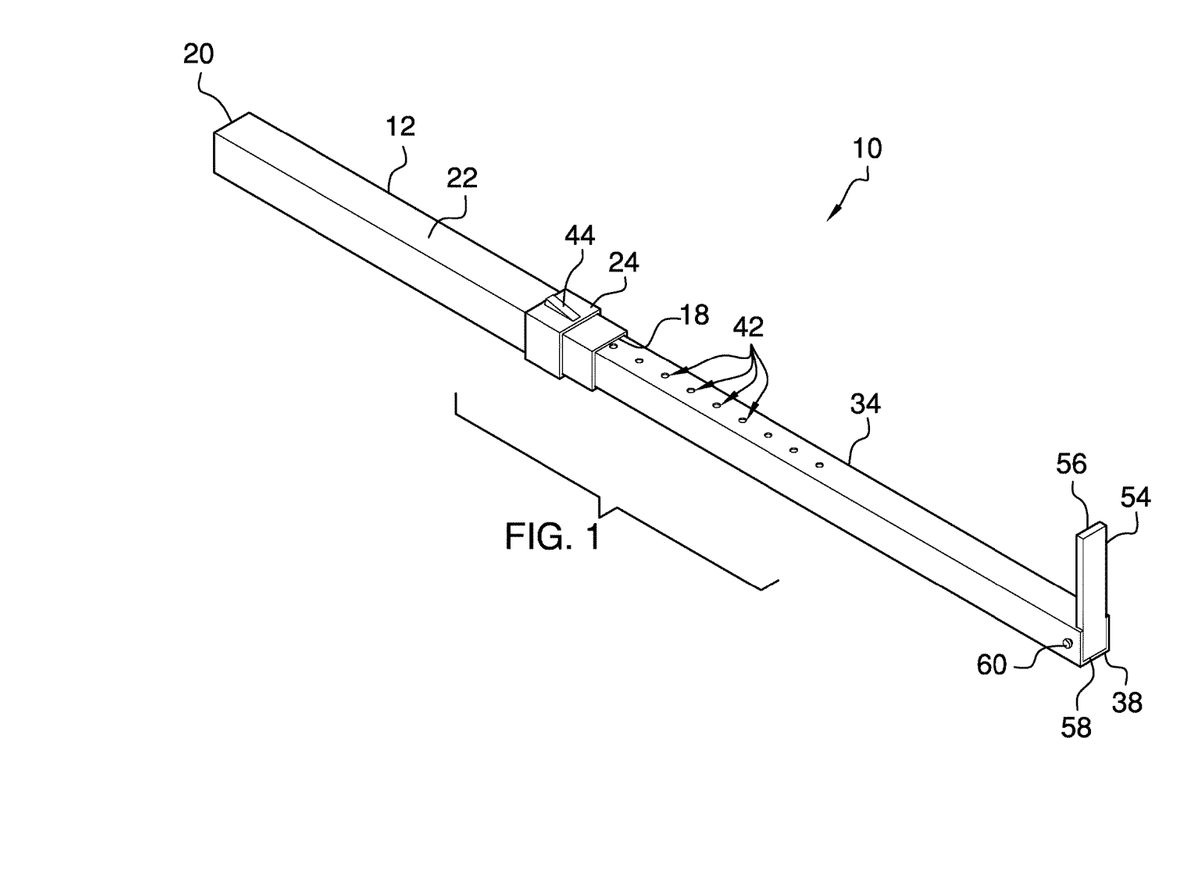
FIG. 1 is a top perspective view of a cargo retrieval assembly according to an embodiment of the disclosure.
Figure 2:
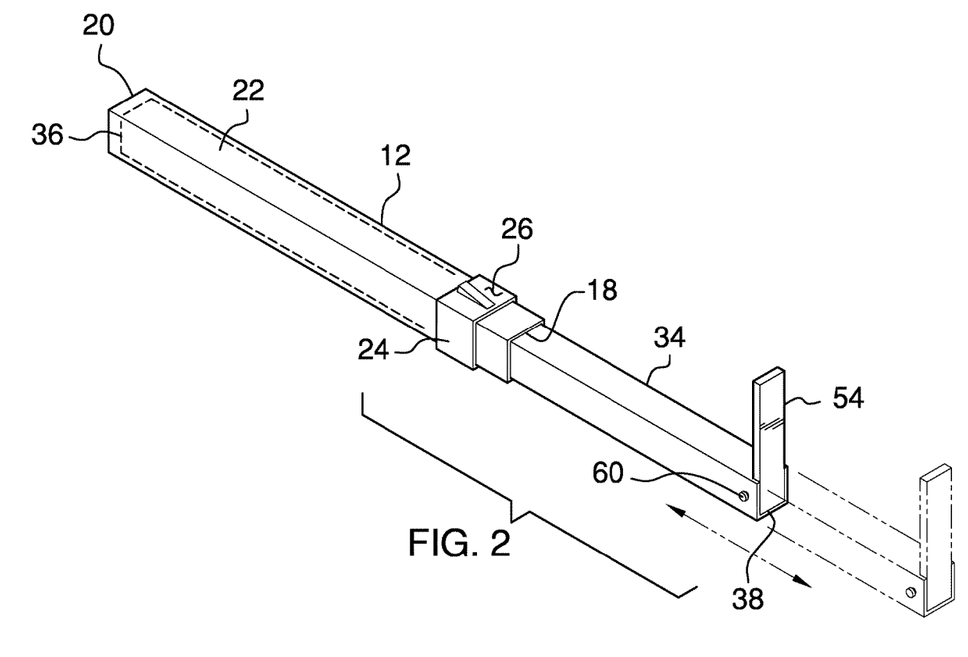
FIG. 2 is a perspective phantom view of an embodiment of the disclosure.
Figure 3:
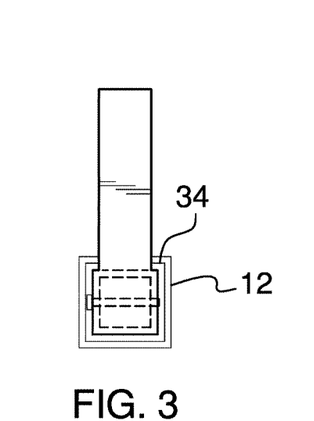
FIG. 3 is a front phantom view of an embodiment of the disclosure.
Figure 4:
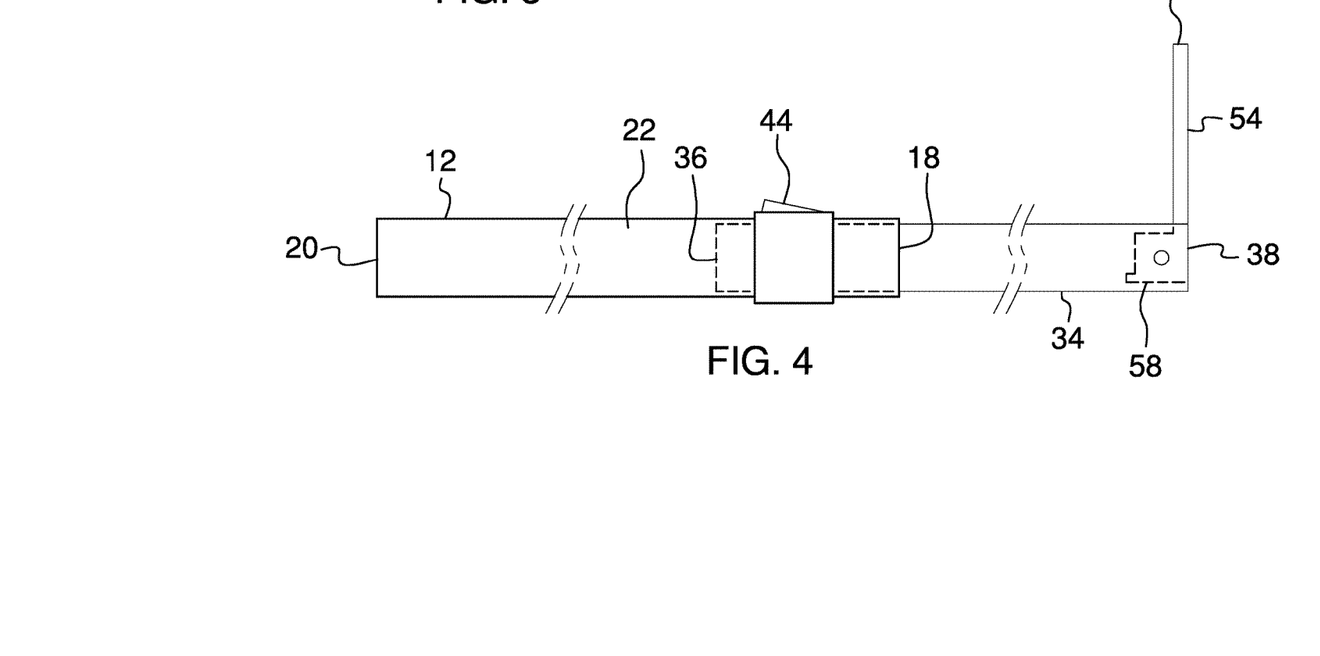
FIG. 4 is a right side phantom view of an embodiment of the disclosure.
Figure 5:
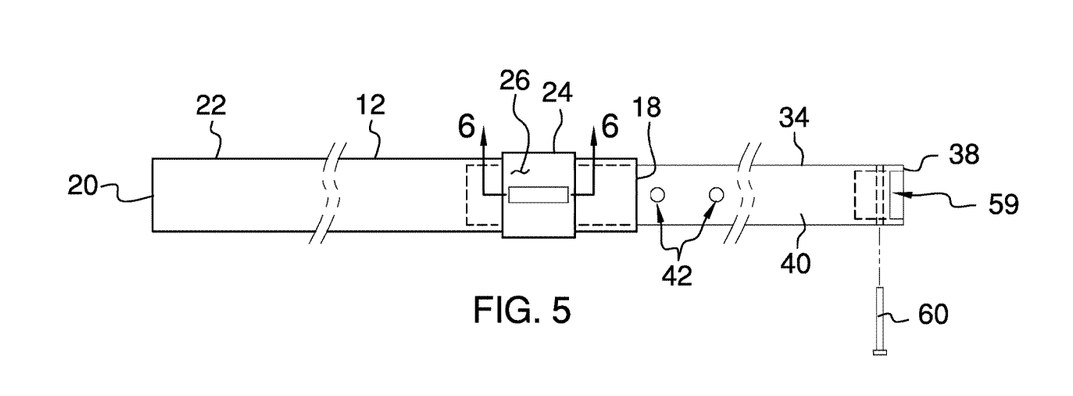
FIG. 5 is a top view of an embodiment of the disclosure.
Figure 6:
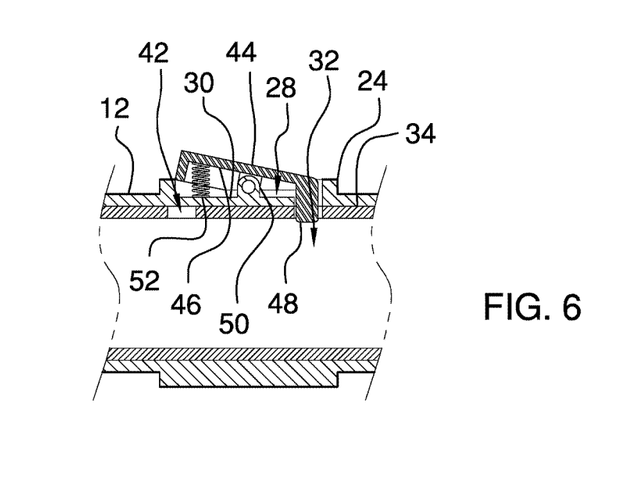
FIG. 6 is a cross sectional view taken along line 6-6 of FIG. 5 of an embodiment of the disclosure.
Figure 7:
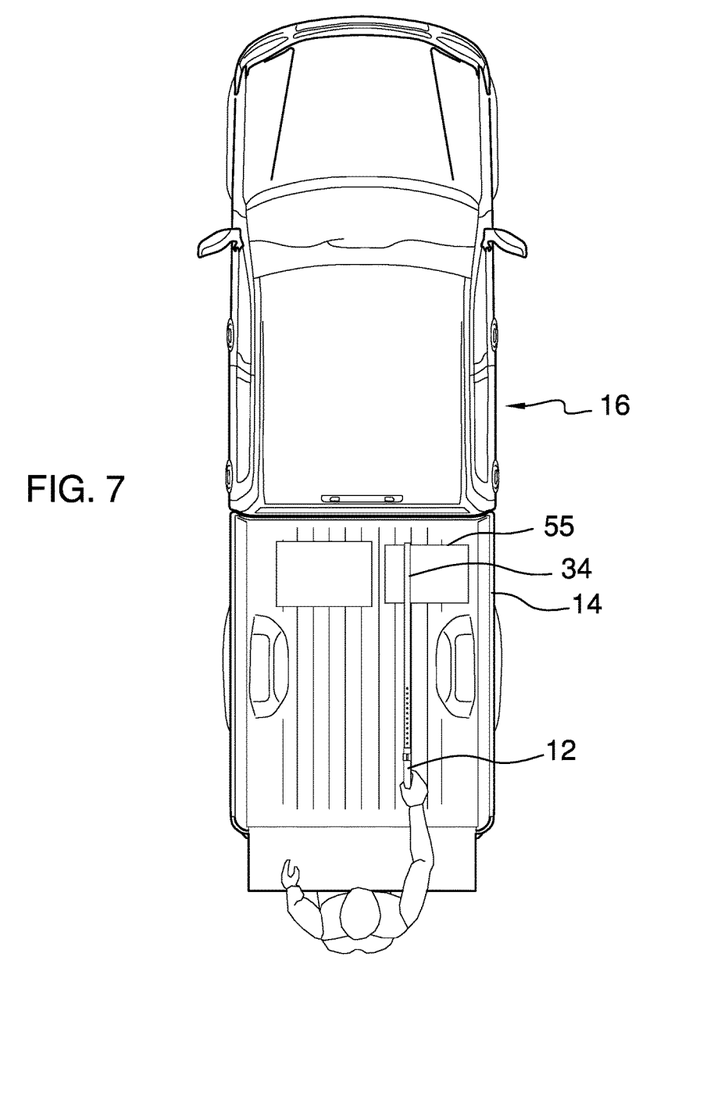
FIG. 7 is a perspective in-use view of an embodiment of the disclosure.
Figure 8:
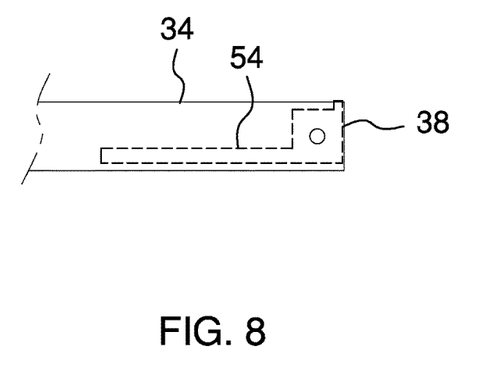
FIG. 8 is a right side phantom view of an embodiment of the disclosure showing a grapple in a stored position.

With reference now to the drawings, and in particular to FIGS. 1 through 8 thereof, a new retrieval device embodying the principles and concepts of an embodiment of the disclosure and generally designated by the reference numeral 10 will be described.

As best illustrated in FIGS. 1 through 8, the cargo retrieval assembly 10 generally comprises a handle 12 has a length of at least 1.2 meters for extending into a bed 14 of a pickup 16 or any other vehicle that has a cargo bed. The handle 12 has a first end 18, a second end 20 and an outer wall 22 extending therebetween, the first end 18 is open and the handle 12 is hollow. The outer wall 22 has a protrusion 24 extending outwardly therefrom and the protrusion 24 extends around an entire perimeter of the outer wall 22. The protrusion 24 has a distal surface 26 with respect to the outer wall 22 and the distal surface 26 has a well 28 extending toward the outer wall 22. The well 28 has a bounding surface 30 and the outer wall 22 has an aperture 32 extending through the bounding surface 30 into an interior of the handle 12.

A member 34 is slidably positioned in the handle 12 such that the handle 12 and the member 34 combine to have a telescopically adjustable length, and the member 34 has a length of at least 1.2 meters. The member 34 has a primary end 36, a secondary end 38 and an outside wall 40 extending therebetween, the secondary end 38 is open and the member 34 is hollow. The first end 18 of the handle 12 insertably receives the primary end 36 of the member 34. The outside wall 40 has a plurality of holes 42 extending an interior of the member 34, and the holes 42 are spaced apart from each other and are distributed between the primary 36 and secondary 38 ends.

A rocker 44 is pivotally coupled to the handle 12 and the rocker 44 is biased into a locking position. The rocker 44 engages the member 34 when the rocker 44 is in the locking position to retain the handle 12 and the member 34 at a selected length. The rocker 44 disengages the member 34 when the rocker 44 is manipulated for adjusting the telescopic length of the handle 12 and the member 34. The rocker 44 has a bottom side 46 and a foot 48 extending away from the bottom side 46. A fulcrum 50 is coupled to the bounding surface 30 of the well 28 and the bottom side 46 of the rocker 44 is pivotally coupled to the fulcrum 50. Moreover, the foot 48 is aligned with the aperture 32 in the well 28 in the distal surface 26 of the protrusion 24 on the handle 12.

A biasing member 52, such as a spring or the like, is positioned between the bounding surface 30 of the well 28 and the bottom side 46 of the rocker 44. The biasing member 52 biases the foot 48 downwardly through the aperture 32 and into a selected one of the holes 42 in the member 34. In this way the rocker 44 retains the member 34 and the handle 12 at the selected length. A grapple 54 is removably coupled to the member 34 having the grapple 54 being oriented perpendicular to the member 34. In this way the grapple 54 can engage cargo 55 when the member 34 is extended into the bed 14 of the pickup 16.

The grapple 54 has a first end 56 and a second end 58, and the first end 56 of the grapple 54 is pivotally coupled to the outside wall 40 of the member 34. The grapple 54 is positionable in a deployed position having the grapple 54 being oriented perpendicular to the member 34. The secondary end 38 of the member 34 has a slot 59 therein and the grapple 54 engages the slot 59 in the secondary end 38 of the member 34 when the grapple 54 is in the deployed position. In this way the grapple 54 is inhibited from deflecting from the perpendicular orientation when the grapple 54 engages the cargo 55. The grapple 54 is positionable in a stored position having the grapple 54 being inserted into the secondary end 38 of the member 34 for storage. A pin 60 extends through the outside wall 40 of the member 34 and engages the second end 58 of the grapple 54.

In use, the rocker 44 is depressed and the member 34 is slid in the handle 12 to the selected length. The rocker 44 is released such that the rocker 44 engages a selected one of the holes 42 in the member 34. The member 34 is extended into the bed 14 of the pickup 16 thereby facilitating the grapple 54 to engage the cargo 55. The member 34 is drawn toward a user thereby urging the cargo 55 toward the user. In this way the cargo 55 can be retrieved from the bed 14 of the pickup 16 without requiring the user to enter the bed 14. The pin is removed from the grapple 54, the grapple 54 is inserted into the secondary end 38 of the member 34 for storage and the pin is re-inserted into the grapple 54 to retain the grapple 54 within the member 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cargo retrieval assembly being selectively extended into a bed of a truck for retrieving cargo, said assembly comprising:
    a handle having a length of at least 1.2 meters wherein said handle is configured to be extended into a bed of a pickup;
    a member being slidably positioned in said handle such that said handle and said member combine to have a telescopically adjustable length, said member having a length of at least 1.2 meters;
    a rocker being pivotally coupled to said handle, said rocker being biased into a locking position, said rocker engaging said member when said rocker is in said locking position to retain said handle and said member at a selected length, said rocker disengaging said member when said rocker is manipulated for adjusting said telescopic length of said handle and said member; and
    a grapple being removably coupled to said member having said grapple being oriented perpendicular to said member wherein said grapple is configured to engage, and thusly retrieve, cargo when said member is extended into the bed of the pickup.

2. The assembly according to claim 1, wherein said handle has a first end, a second end and an outer wall extending therebetween, said first end being open, said handle being hollow, said outer wall having a protrusion extending outwardly therefrom, said protrusion extending around an entire perimeter of said outer wall, said protrusion having a distal surface with respect to said outer wall.

3. The assembly according to claim 2, wherein:
    said distal surface has a well extending toward said outer wall, said well having a bounding surface;
    said outer wall having an aperture extending through said bounding surface an into an interior of said handle; and
    a fulcrum being coupled to said bounding surface of said well.

4. The assembly according to claim 3, wherein said member has a primary end, a secondary end and an outside wall extending therebetween, said secondary end being open, said member being hollow, said first end of said handle insertably receiving said primary end of said member, said outside wall having a plurality of holes extending an interior of said member, said holes being spaced apart from each other and being distributed between said primary and secondary ends.

5. The assembly according to claim 4, wherein:
    said rocker has a bottom side and a foot extending away from said bottom side, said bottom side being pivotally coupled to said fulcrum having said foot being aligned with said aperture in said well in said distal surface of said protrusion on said handle; and
    a biasing member being positioned between said bounding surface of said well and said bottom side of said rocker, said biasing member biasing said foot downwardly through said aperture and into a selected one of said holes in said member.

6. The assembly according to claim 4, wherein:
    said grapple has a first end and a second end, said first end of said grapple being pivotally coupled to said outside wall of said member;
    said grapple being positionable in a deployed position having said grapple being oriented perpendicular to said member, said grapple abutting said secondary end of said member when said grapple is in said deployed position thereby inhibiting said grapple from deflecting from said perpendicular orientation; and said grapple is positionable in a stored position having said grapple being inserted into said secondary end of said member for storage.

7. A cargo retrieval assembly being selectively extended into a bed of a truck for retrieving cargo, said assembly comprising:

a handle having a length of at least 1.2 meters wherein said handle is configured to be extended into a bed of a pickup, said handle having a first end, a second end and an outer wall extending therebetween, said first end being open, said handle being hollow, said outer wall having a protrusion extending outwardly therefrom, said protrusion extending around an entire perimeter of said outer wall, said protrusion having a distal surface with respect to said outer wall, said distal surface having a well extending toward said outer wall, said well having a bounding surface, said outer wall having an aperture extending through said bounding surface an into an interior of said handle;

a member being slidably positioned in said handle such that said handle and said member combine to have a telescopically adjustable length, said member having a length of at least 1.2 meters, said member having a primary end, a secondary end and an outside wall extending therebetween, said secondary end being open, said member being hollow, said first end of said handle insertably receiving said primary end of said member, said outside wall having a plurality of holes extending an interior of said member, said holes being spaced apart from each other and being distributed between said primary and secondary ends;

a fulcrum being coupled to said bounding surface of said well;

a rocker being pivotally coupled to said handle, said rocker being biased into a locking position, said rocker engaging said member when said rocker is in said locking position to retain said handle and said member at a selected length, said rocker disengaging said member when said rocker is manipulated for adjusting said telescopic length of said handle and said member, said rocker having a bottom side and a foot extending away from said bottom side, said bottom side being pivotally coupled to said fulcrum having said foot being aligned with said aperture in said well in said distal surface of said protrusion on said handle;

a biasing member being positioned between said bounding surface of said well and said bottom side of said rocker, said biasing member biasing said foot downwardly through said aperture and into a selected one of said holes in said member;

a grapple being removably coupled to said member having said grapple being oriented perpendicular to said member wherein said grapple is configured to engage cargo when said member is extended into the bed of the pickup, said grapple having a first end and a second end, said first end of said grapple being pivotally coupled to said outside wall of said member, said grapple being positionable in a deployed position having said grapple being oriented perpendicular to said member, said grapple abutting said secondary end of said member when said grapple is in said deployed position thereby inhibiting said grapple from deflecting from said perpendicular orientation, said grapple being positionable in a stored position having said grapple being inserted into said secondary end of said member for storage; and a pin extending through said outside wall of said member and engaging said second end of said grapple.

* * * * *